(12) United States Patent
Liu et al.

(10) Patent No.: US 10,271,180 B2
(45) Date of Patent: Apr. 23, 2019

(54) NEIGHBOR AWARENESS NETWORKING MULTICAST SUPPORT

(71) Applicant: Apple Inc., Cupertino, CA (US)

(72) Inventors: Yong Liu, Campbell, CA (US); Su Khiong Yong, Palo Alto, CA (US); Christiaan A. Hartman, San Jose, CA (US); Lawrie Kurian, San Jose, CA (US); Peter N. Heerboth, San Jose, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 15/404,631

(22) Filed: Jan. 12, 2017

(65) Prior Publication Data

US 2017/0201866 A1 Jul. 13, 2017

Related U.S. Application Data

(60) Provisional application No. 62/278,140, filed on Jan. 13, 2016.

(51) Int. Cl.
*H04W 4/06* (2009.01)
*H04W 4/80* (2018.01)
H04L 12/18 (2006.01)
H04W 84/12 (2009.01)

(52) U.S. Cl.
CPC ............. *H04W 4/06* (2013.01); *H04W 4/80* (2018.02); *H04L 12/189* (2013.01); *H04W 84/12* (2013.01)

(58) Field of Classification Search
CPC ......... H04W 4/06; H04W 4/80; H04W 84/12; H04L 12/189
See application file for complete search history.

(56) References Cited

U.S. PATENT DOCUMENTS

| | | | |
|---|---|---|---|
| 2003/0100325 A1* | 5/2003 | Paila | H04H 20/28 455/506 |
| 2009/0036152 A1* | 2/2009 | Janneteau | H04L 12/189 455/503 |
| 2015/0350866 A1 | 12/2015 | Patil et al. | |
| 2016/0286398 A1 | 9/2016 | Abraham et al. | |
| 2016/0286461 A1 | 9/2016 | Patil et al. | |
| 2016/0309315 A1 | 10/2016 | Shmukler et al. | |
| 2016/0309493 A1 | 10/2016 | Shmukler et al. | |

* cited by examiner

*Primary Examiner* — Jianye Wu
(74) *Attorney, Agent, or Firm* — Meyertons Hood Kivlin Kowert & Goetzel, P.C.; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to a mechanism for a device to perform multicast communications amongst a group of peer devices. Embodiments described herein provide mechanisms for initiation (or establishment) and scheduling of a multicast group as well as enrollment of a device into a multicast group, merging of multicast groups, and termination of multicast groups.

20 Claims, 10 Drawing Sheets

NEIGHBOR AWARENESS NETWORKING MULTICAST SUPPORT

PRIORITY DATA

This application claims benefit of priority to U.S. Provisional Application Ser. No. 62/278,140, titled "Neighbor Awareness Networking Multicast Support", filed Jan. 13, 2016, by Yong Liu, Su Khiong Yong, Christiaan A. Hartman, Lawrie Kurian, Peter N. Heerboth, and Guoqing Li, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Some embodiments described herein relate to systems and methods for peer wireless stations (e.g., wireless stations configured to communicate with neighboring wireless stations without utilizing an intermediate access point) to initiate, schedule and discover multicast groups.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to a mechanism for peer devices to perform multicast communications amongst a group of peer devices. Embodiments described herein provide mechanisms for initiation (or establishment) and scheduling of a multicast group as well as enrollment of a device into a multicast group, merging of multicast groups, and termination of multicast groups.

In some embodiments, the communications may be performed via a peer-to-peer wireless communications protocol such as Neighbor Awareness Networking (NAN). Thus, embodiments of the disclosure also relate to NAN multicast group formation, including role selection and scheduling within the NAN framework. The NAN embodiments described herein provide a mechanism for a NAN device to initiate (or establish) and schedule a multicast group as well as to enroll neighboring NAN devices into a multicast group, merge multicast groups, and terminate multicast groups.

In some embodiments, a wireless station may be configured to advertise a multicast service instance to one or more neighboring wireless stations and receive a request for a multicast session for the multicast service instance from a neighboring wireless station. The wireless station may be further configured to specify at least one parameter defining the multicast service instance (e.g., a session identifier, security type, and/or multicast schedule) and transmit the at least one parameter to the neighboring wireless station. In some embodiments, the advertisement may include a multicast service group role of the wireless station and the one or more parameters may also define a multicast service group.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
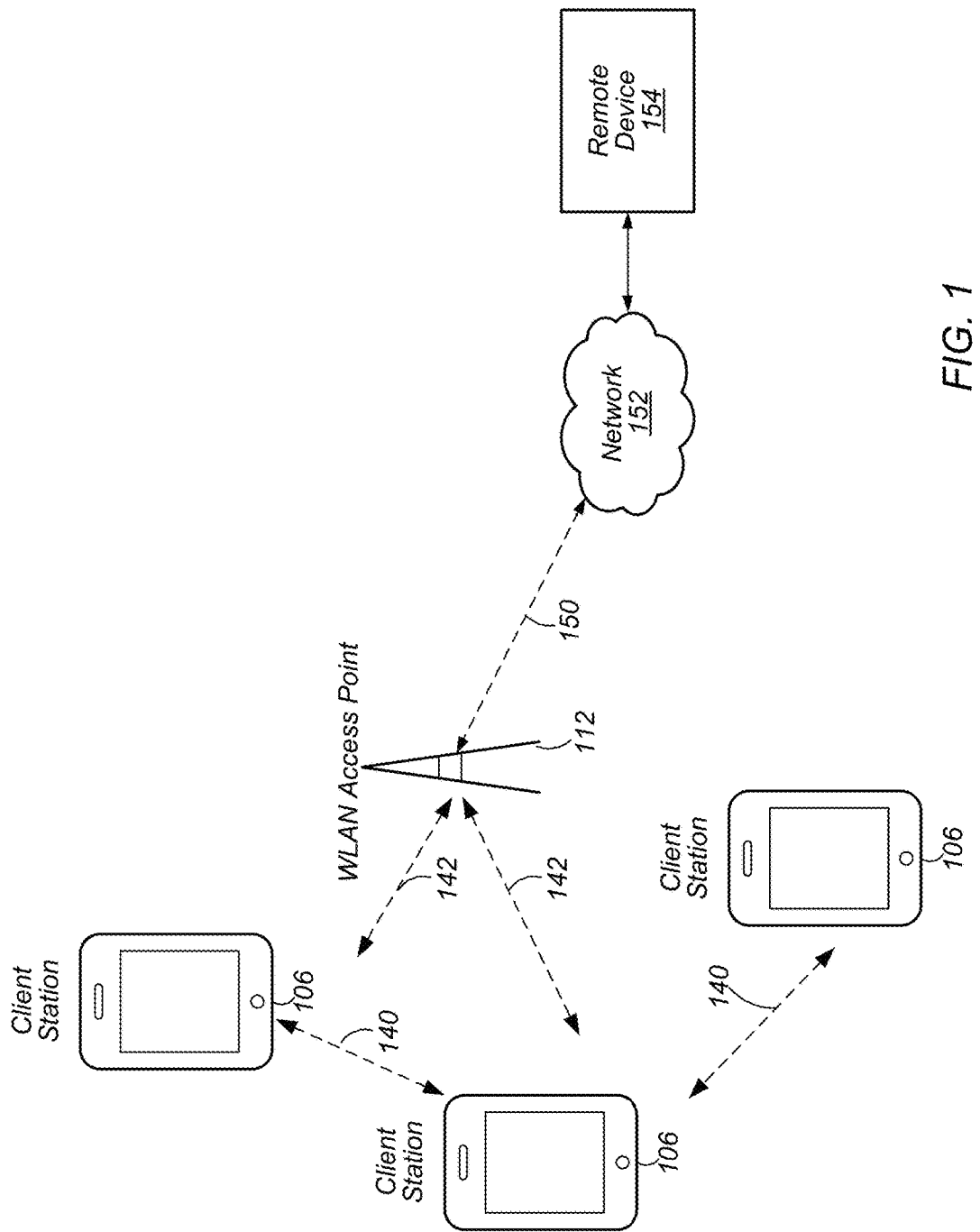
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to advertise a multicast service instance to one or more neighboring wireless devices and receive a request for a multicast session for the multicast service instance from a neighboring wireless device. Wireless device 106 may be further configured to specify at least one parameter defining the multicast service instance (e.g., a session identifier, security type, and/or multicast schedule) and transmit the at least one parameter to the neighboring wireless device. In some embodiments, the advertisement may include a multicast service group role of wireless device 106 and the one or more parameters may also define a multicast service group.

Figure 2:
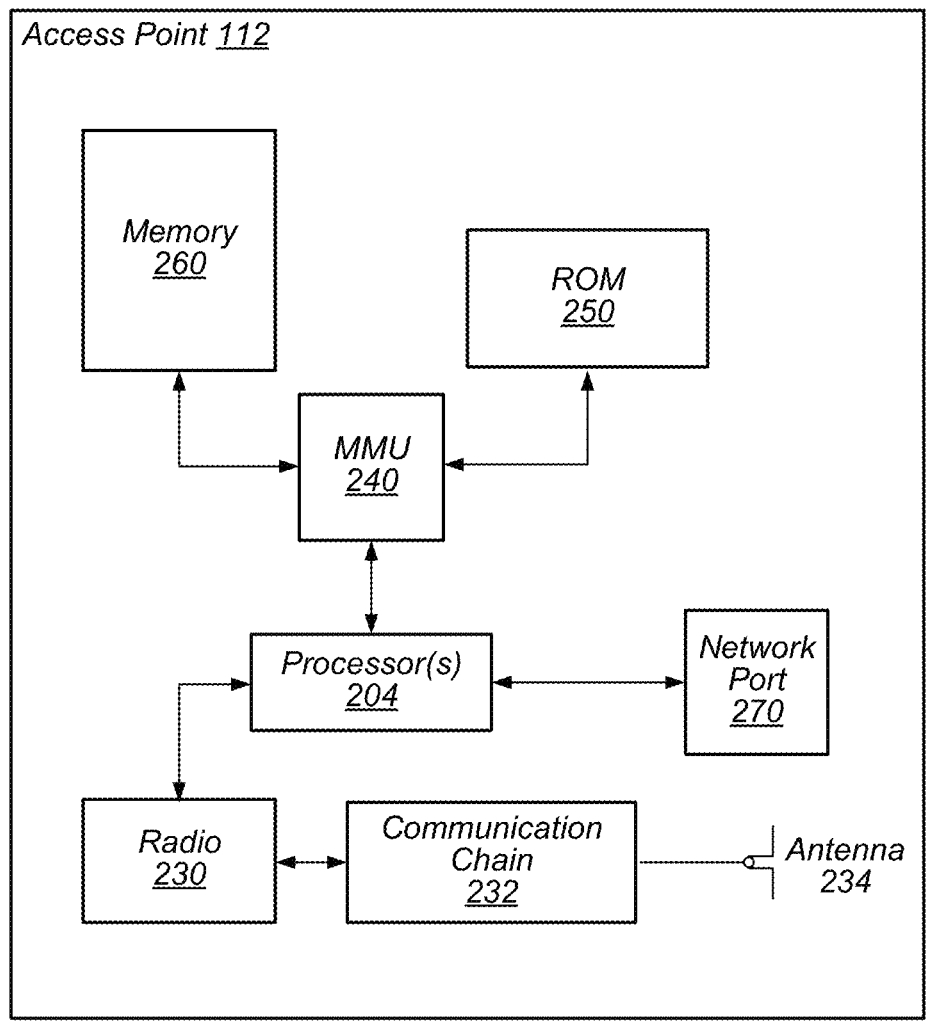
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to advertise a multicast service instance to one or more neighboring wireless stations 106 and receive a request for a multicast session for the multicast service instance from a neighboring wireless station 106. AP 112 may be further configured to specify at least one parameter defining the multicast service instance (e.g., a session identifier, security type, and/or multicast schedule) and transmit the at least one parameter to the neighboring wireless device. In some embodiments, the advertisement may include a multicast service group role of AP 112 and the one or more parameters may also define a multicast service group.

Figure 3:
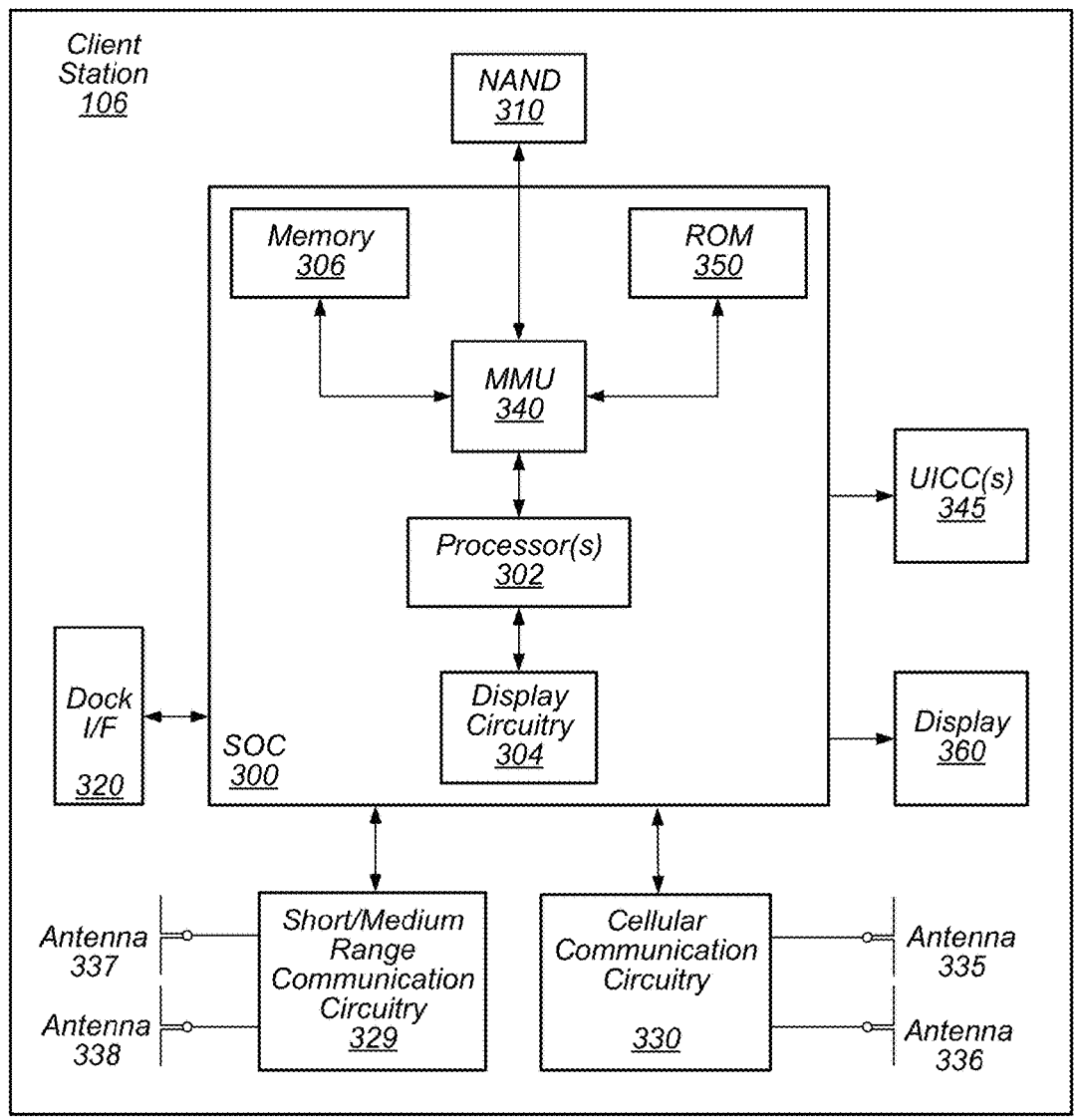
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to advertise a multicast service instance to one or more neighboring client stations and receive a request for a multicast session for the multicast service instance from a neighboring client station. Client station 106 may be further configured to specify at least one parameter defining the multicast service instance (e.g., a session identifier, security type, and/or multicast schedule) and transmit the at least one parameter to the neighboring client station. In some embodiments, the advertisement may include a multicast service group role of client station 106 and the one or more parameters may also define a multicast service group.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Figure 4B:
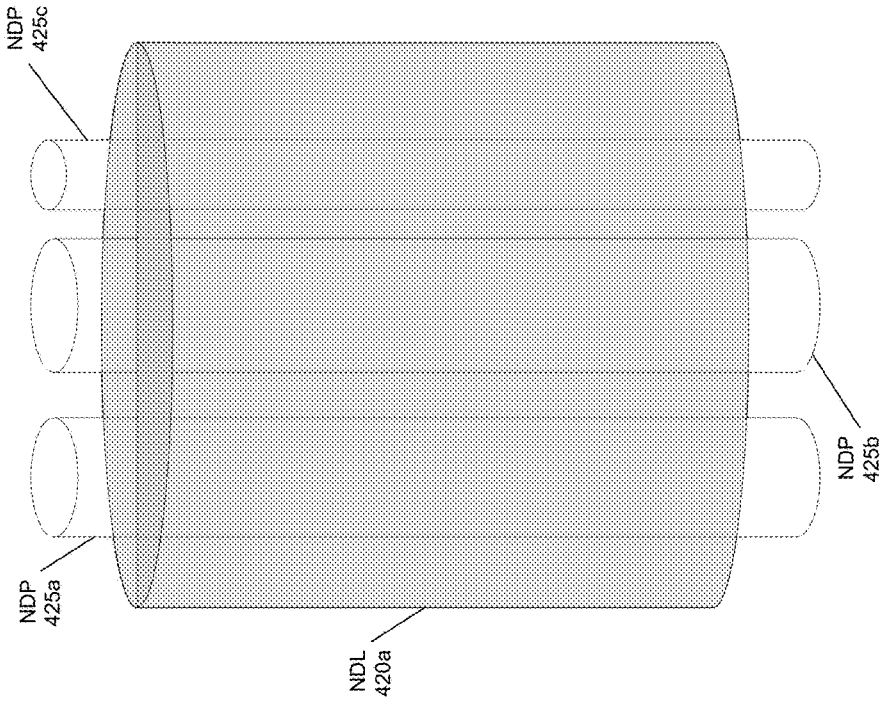
FIG. 4B illustrates the relationship between a NAN data link and a NAN datapath, according to existing implementations.
Figure 4A:
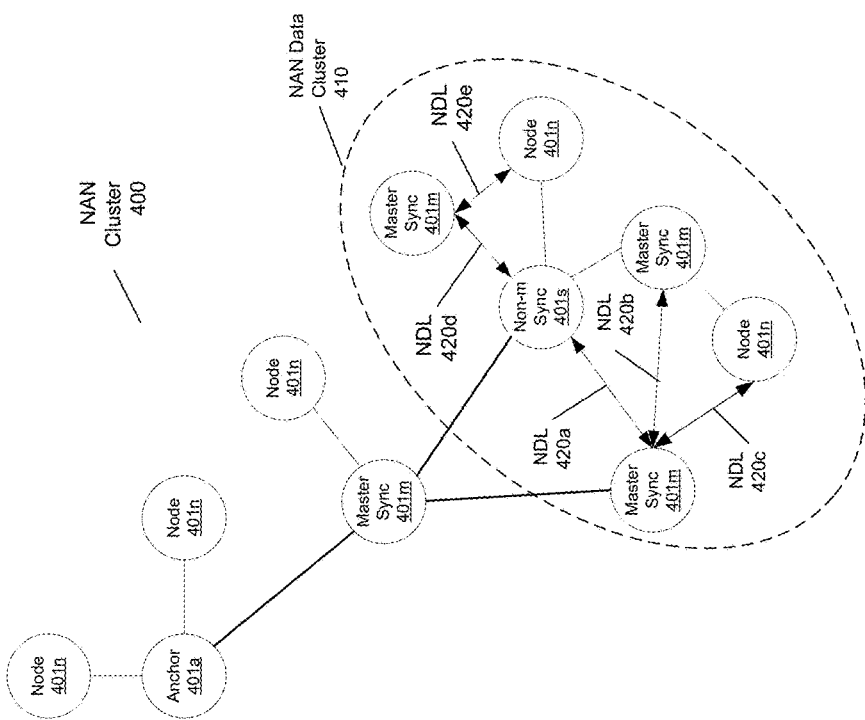
FIG. 4A illustrates a NAN cluster that includes a NAN data cluster supporting multiple NAN datalinks, according to existing implementations.

FIG. 4A illustrates a NAN cluster that includes a NAN data cluster supporting multiple NAN datalinks, according to existing implementations. As illustrated, NAN cluster 400 that includes anchor master device 401a, master sync devices 401m, non-master sync device 401s, and nodes 401n. As illustrated, NAN cluster 400 may include NAN data cluster 410 which may include NAN data links 420a-e FIG. 4B illustrates the relationship between a NAN data link and a NAN datapath, according to existing implementations. As illustrated, a NAN data link (NDL), such as NAN NDL 420a may be associated with radio resource allocations for one or more NAN datapaths (NDPs), such as NDPs 425a-c, and an NDP may be associated with data communication between two devices for a service instance. In other words, a unicast data communication between two devices for a service instance.

Figure 5:
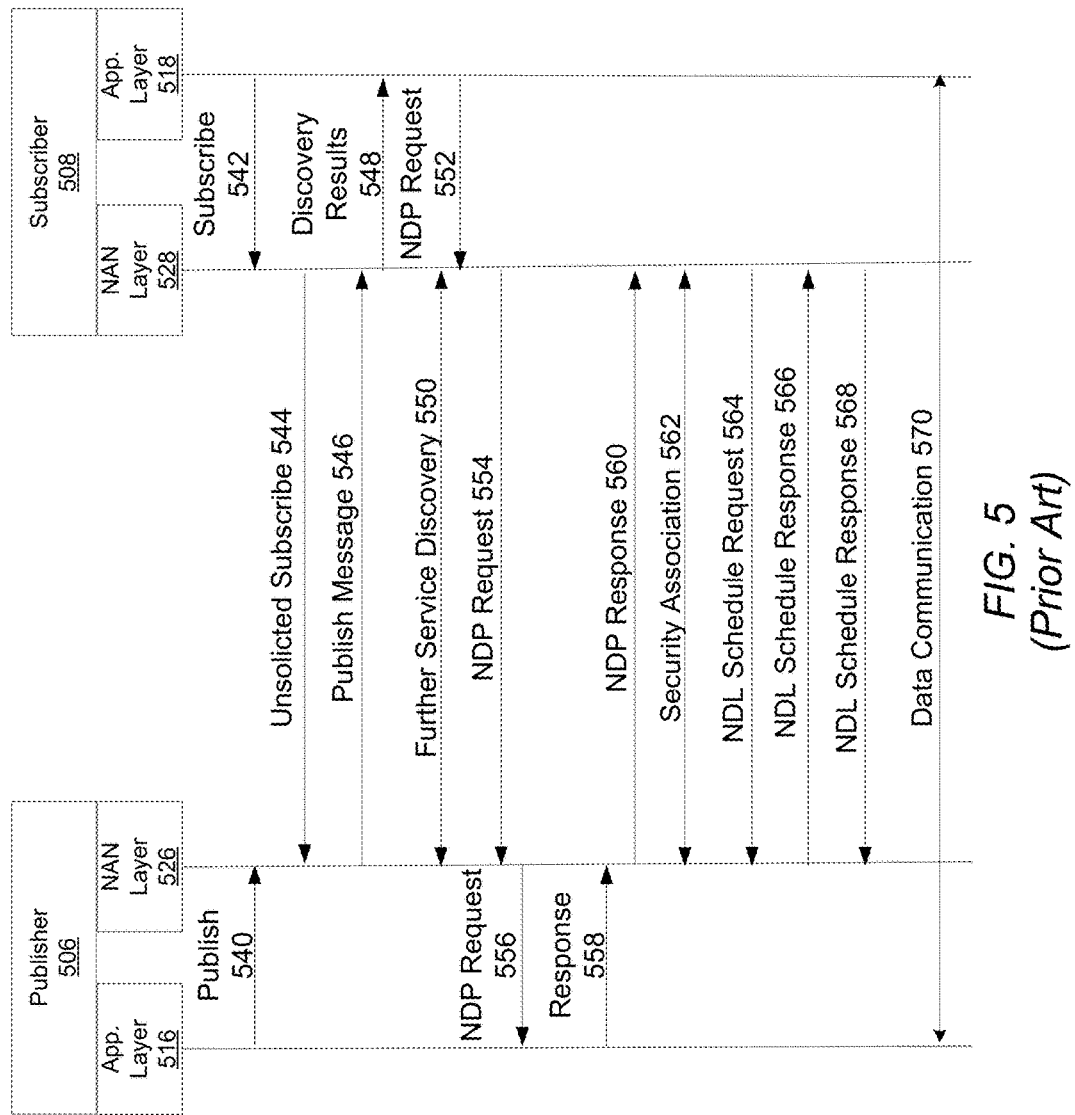
FIG. 5 illustrates a signaling exchange between a publisher and a subscriber to establish an NDP, according to existing implementations.

FIG. 5 illustrates a signaling exchange between a publisher and a subscriber to establish an NDP, according to existing implementations. As illustrated, at 540, an application layer 516 of a publisher 506 may transmit a notification (or indication) to publish a service to NAN layer 526. Similarly, at 542, an application layer 518 of a subscriber 508 may transmit a notification (or indication) to subscribe to a service to NAN layer 528. At 544, NAN layer 528 may transmit an unsolicited subscribe message to NAN layer 526 indicating a service to which NAN layer 528 intends to subscribe. At 546, NAN layer 526 may respond with a publish message to NAN layer 528. At 548, NAN layer 528 may transmit discovery results to application layer 518. At 550, NAN layers 526 and 528 may exchange transmissions for further service discovery schedule setup and further service discovery operations. At 552, application layer 518 may transmit a datapath request to NAN layer 528 indicating a service match based on the discovery results. At 554, NAN layer 528 may transmit a NAN datapath request to NAN layer 526. At 556, NAN layer 526 may transmit the datapath request to application layer 516. At 558, application layer 516 may transmit a response to NAN layer 526 indicating a service match. At 560, NAN layer 526 may transmit a NAN datapath response to NAN layer 528. At 562, NAN layers 516 and 528 may exchange messages for security association. At 564, NAN layer 528 may transmit a NAN datalink schedule request to NAN layer 526. At 566, NAN layer 526 may transmit a NAN datalink schedule response to NAN layer 528. At 568, NAN layer 528 may transmit a NAN datalink schedule confirmation to NAN layer 526. At 570, data communication may be exchanged between application layers 516 and 518.

Figure 6:
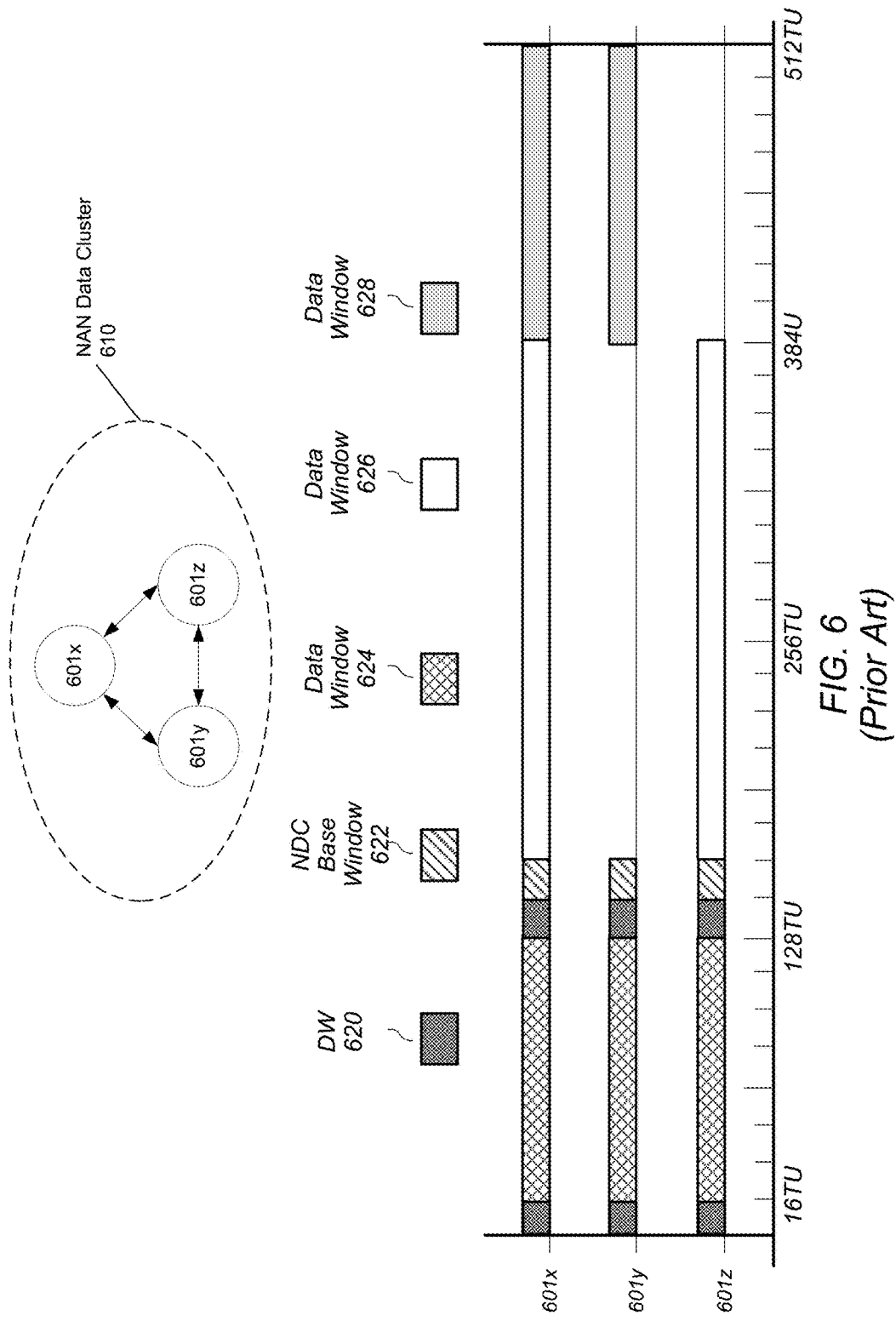
FIG. 6 illustrates a NAN unicast schedule between devices within an NDC, according to existing implementations.

FIG. 6 illustrates a NAN unicast schedule between devices within a NAN data cluster, according to existing implementations. As shown, devices 601x, 601y, and 601z may be in a NAN data cluster (NDC) 610 and may share common discover windows, 620, and a common NDC base window, 622. After a first discovery window 620, each device may announce its availability schedules to receive data and other devices can make use of a devices announced availability schedule to transmit data to the device during window 624. In addition, each NAN device within (or associated with) an NDC will be present during NDC base windows 622. Such a scheme allows for devices to establish unicast schedules (e.g., window 626 for communication between devices 601x and 601z and window 628 for communication between devices 601x and 601y) to share data with one or more peer devices. In other words, current NDP and NDL setup protocols are designed for unicast data communications, however, some services may require a NAN layer to provide multicast data communication support such as support for a one-to-many multicast scenario (e.g., a single multicast source and multiple multicast sinks) and for a many-to-many multicast scenario (e.g., multiple multicast sources and multiple multicast sinks in which some devices may serve as both multicast source and multicast sink).

Embodiments described herein further define methods (and/or mechanisms) for a wireless station (including, but not limited to, a NAN device) to initiate (or establish) and schedule a multicast group as well as to enroll a device into a multicast group, merge multicast groups, and terminate a multicast group.

NAN Multicast—Session Initiation

In some embodiments, a NAN multicast service group (NMSG or multicast group) may be defined for a NAN layer to provide multicast support to services. In some embodiments, services that require NAN multicast support may be able to configure one or more of multicast roles (such as source, sink, or both), multicast group roles (such as founder/non-founder or enroller/non-enroller), multicast group parameters (such as multicast IP address and multicast UDP port number), MAC level multicast security (such as open security, shared key, and/or individual source key), and multicast schedule requirements. In some embodiments, a NAN device, e.g., such as wireless station 106, configured to be a multicast source for a service instance may advertise the service and its role in service discovery and/or service initiation messages.

Figure 7:
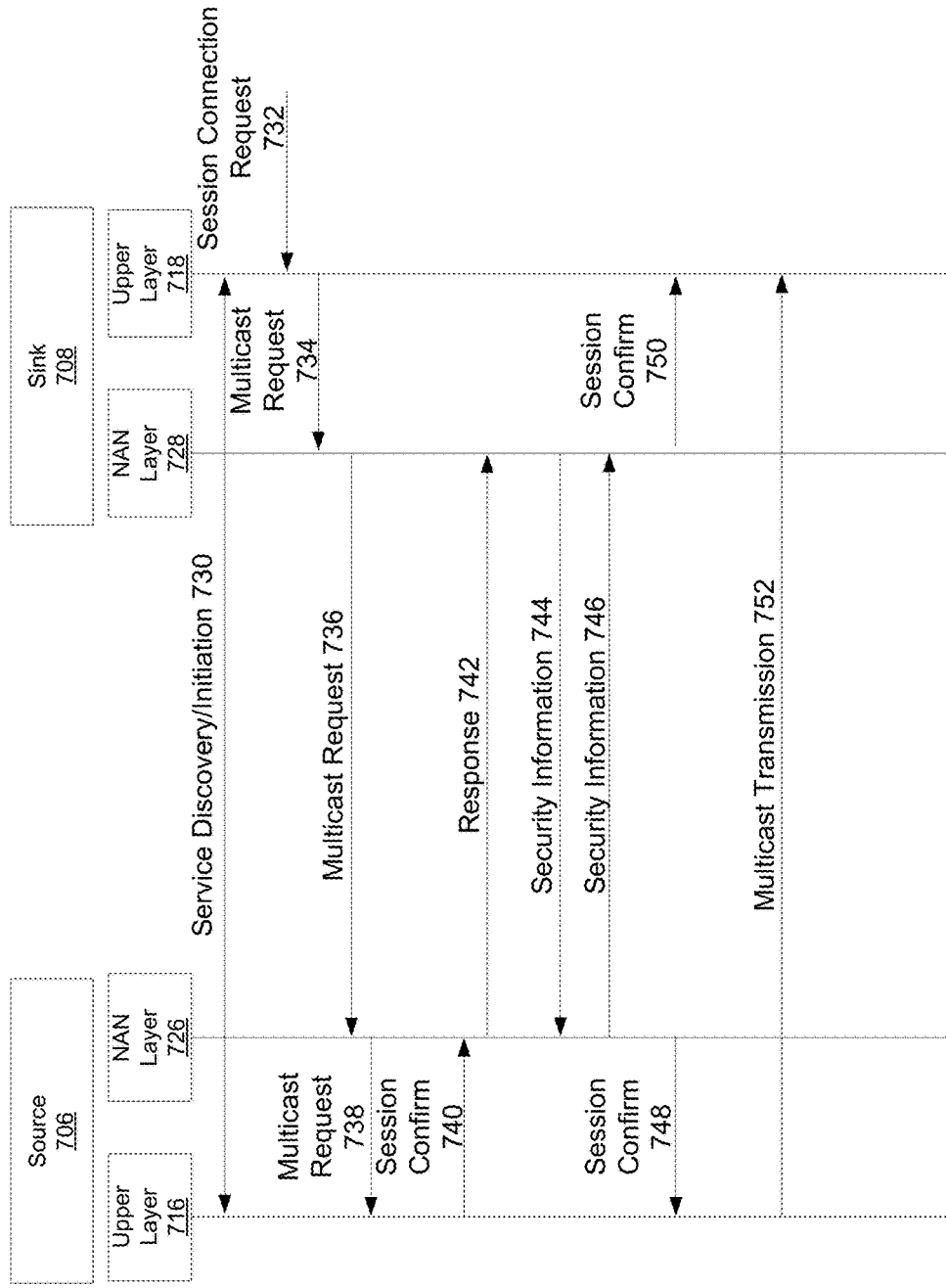
FIG. 7 illustrates an example of initiation of a NAN multicast service group (NMSG), according to some embodiments.

FIG. 7 illustrates an example of an initiation of a NAN multicast service group (NMSG), according to some embodiments. The signaling shown in FIG. 7 may be used in conjunction with any of the systems or devices shown in the above Figures, among other devices. In various embodiments, some of the signaling shown may be performed concurrently, in a different order than shown, or may be omitted. Additional signaling may also be performed as desired.

As shown, once a service has been discovered and/or initiated at 730, e.g., via negotiation between NAN layer 726 of source 706 and NAN layer 728 of sink 708, a multicast sink 708 may initiate a multicast request at 736 to establish a multicast session and send a first message to a multicast source 706, which may be a founder of the NMSG. Note that source 706 and sink 708 may be wireless stations such as wireless station 106 described above. Note further that source 706 may include upper layer 716 and NAN layer 726. Similarly, sink 708 may include upper layer 718 and NAN layer 728. In some embodiments, the multicast request may be initiated by an application on sink 708 and the application may notify upper layer 718 of the multicast request via a session connection request at 732. Further, upper layer 718 may transmit the multicast request (or an indication of the multicast request) to NAN layer 728 at 734.

In some embodiments, the first message transmitted at 738 may include a multicast request message that may include potential availability of sink 708. At 742, multicast source 706 may response with a second message that may include a MAC address of the NMSG, a session ID, and a transmission (TX) schedule. In some embodiments, NAN layer 726 may transmit the multicast request to upper layer 716 at 738 and upper layer 716 may transmit a multicast session confirmation to NAN layer 726 at 740.

At 744 and 746, NAN layers 726 and 728 may, if necessary, exchange security information. Note that exchange of security information may be based on a type of security of the NMSG (e.g., open, shared key, individual source key).

At 748, NAN layer 726 may confirm the multicast session with upper layer 716. Similarly, at 750, NAN layer 728 may confirm the multicast session with upper layer 718. At 752, upper layer 716 may begin transmission of multicast data to upper layer 718.

In some embodiments, a service instance may configure a NAN device to start an NMSG as a potential NMSG founder. Note that there may be one or more potential NMSG founders in a same NAN neighborhood (e.g., within a NAN data cluster). In addition, in some embodiments, only a multicast source may be an NMSG founder.

A potential NMSG founder may advertise a service (e.g., a service instance which configured the NAN device to start an NMSG) and its roles to adjacent (or neighboring) NAN devices. In some embodiments, the potential NMSG founder may convey (or communicate) NMSG formation information via one or more service discovery messages and/or via one or more higher layer service initiation messages. In response, a NAN device that intends to initiate (or start) an NMSG with the potential NMSG founder may transmit a multicast request message, e.g., such as the first message described above at 736, to the potential NMSG founder. Note that the initiating NAN device may be a multicast sink and the multicast request message may include the initiating NAN device's potential availability schedules (e.g., time windows and/or channels during which the initiating NAN device is available for communication) for a multicast session. In other words, the multicast request message may include a channel and/or time window schedule of when the initiating NAN device can perform communications associated with the multicast session.

In some embodiments, if the potential NMSG founder accepts the multicast request from the NAN device, it may create (or configure) the NMSG and select (or determine) one more parameters that may define (or configure) the NMSG. For example, the potential NMSG founder may determine (or select) an NMSG session ID, a security type for the NMSG session, and/or an NMSG multicast schedule (that may be based, at least in part, on a potential availability schedule included in the multicast request message). In some embodiments, the NMSG session ID may be selected (or determined) to uniquely identify the NMSG session together with an NMSG MAC multicast address (which may be derived from a service IP multicast address). For example, the NMSG session ID may include one or more of multicast port information, a difference between an IP multicast address and a MAC multicast address, the potential NMSG founder's MAC address, and/or a start time for the NMSG session.

After accepting the multicast request from the NAN device and selecting (or determining) parameters for the NMSG, the potential NMSG founder (now an NMSG founder) may transmit a multicast response message to the NAN device, e.g., such as the second message described above at 742. The multicast response message may include the parameters for the NMSG, including the NMSG multicast MAC address, NMSG session ID, the NMSG multicast schedule, and so forth. Note that if multicast security is required for the service, a multicast service confirm message and a multicast security install message may be exchanged to communicate (or convey) multicast security keys, e.g., such as the message exchanged described above in at 744 and 746. Further, if handshakes (e.g., message exchanges) are successful and the multicast session is established, each device may bind a local interface for multicast communication. In addition, once the NMSG is formed, the NMSG founder becomes an NMSG source and the NAN device becomes an NMSG sink.

NAN Multicast—Device Enrollment

Figure 8:
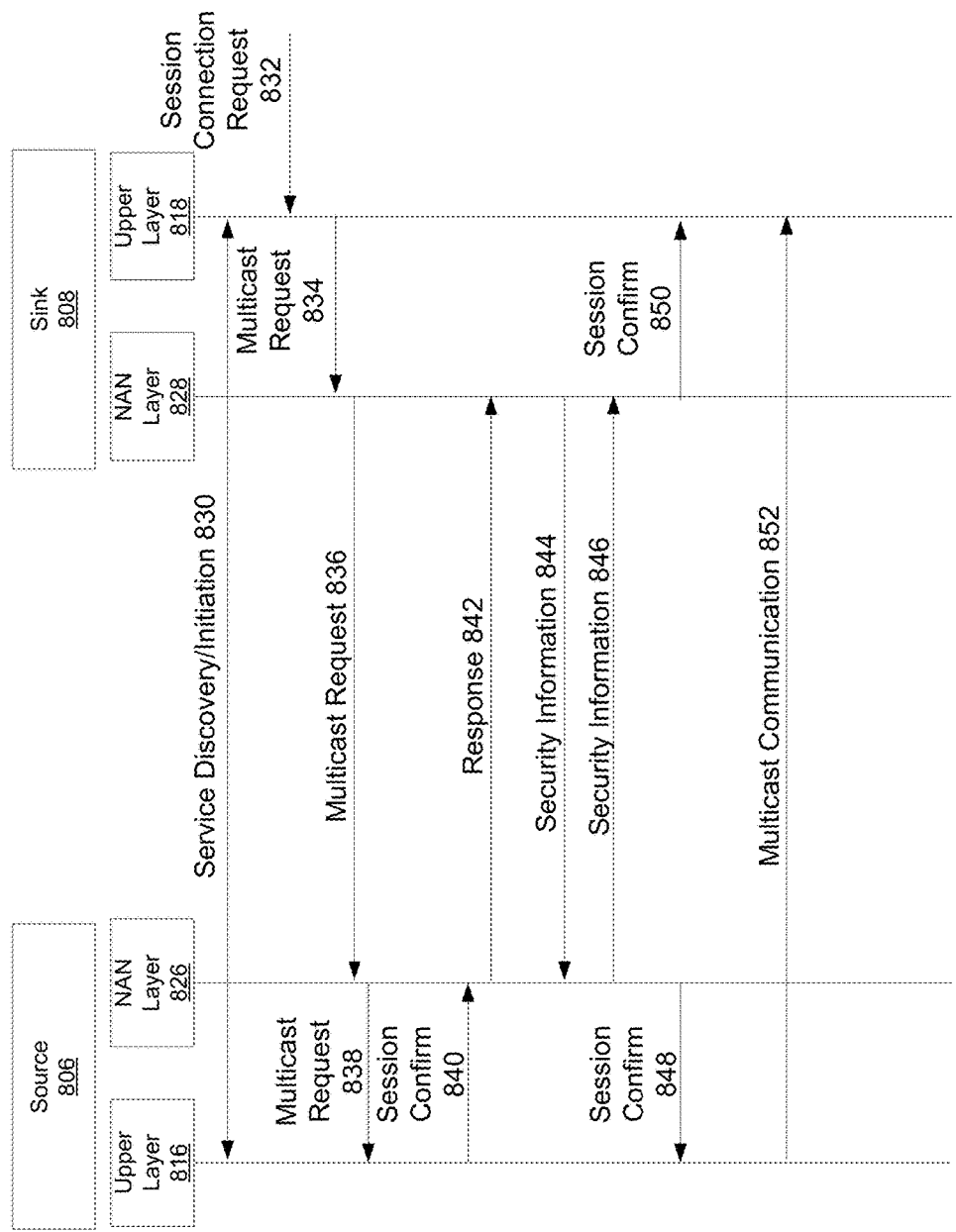
FIG. 8 illustrates example signaling for enrollment of a multicast sink by an NMSG source enroller according to some embodiments.

In some embodiments, a service instance may configure one or more NMSG members, either NMSG source or NMSG sink, as an NMSG enroller. In some embodiments, unless specified otherwise, all NMSG members may assume an NMSG enroller role. FIG. 8, further explained below, illustrates an example of signaling for enrollment of a multicast sink by an NMSG source enroller according to some embodiments and FIG. 9, also further explained below, illustrates an example of signaling for enrollment of a multicast source by an NMSG sink enroller according to some embodiments.

Turing to FIG. 8, the signaling shown in FIG. 8 may be used in conjunction with any of the systems or devices shown in the above Figures, among other devices. In various embodiments, some of the signaling shown may be performed concurrently, in a different order than shown, or may be omitted. Additional signaling may also be performed as desired.

As illustrated, once a service has been discovered and/or initiated at 830, e.g., via negation between NAN layer 826 of source 806 and NAN layer 828 of sink 808, sink device 808 may request to join an NMSG by transmitting a multicast request message at 836 to source device 806, e.g., the NMSG source enroller. Note that source 806 and sink 808 may be wireless stations such as wireless station 106 described above. Note further that source 806 may include upper layer 816 and NAN layer 826. Similarly, sink 808 may include upper layer 818 and NAN layer 828. In some embodiments, the multicast request may be initiated by an application on sink 808 and the application may notify upper layer 818 of the multicast request via a session connection request at 832. Further, upper layer 818 may transmit the multicast request (or an indication of the multicast request) to NAN layer 828 at 834.

In some embodiments, the multicast request message transmitted at 836 may include potential availability of sink 808. Source 806 (e.g., the NMSG source enroller) may accept or reject the multicast request and transmit a multicast response message to the multicast sink at 842. If the multicast request is accepted, the multicast response message may include parameters for the NMSG as described above (e.g., NMSG multicast MAC address, NMSG session ID, NMSG multicast schedule, and so forth). In addition, if the service instance requires security, multicast security confirm and multicast security install messages may be exchanged to communicate (or convey) multicast security keys. In some embodiments, NAN layer 826 may transmit the multicast request received at 836 to upper layer 816 at 838 and upper layer 816 may transmit a multicast session confirmation or rejection to NAN layer 826 at 840.

At 844 and 846, NAN layers 826 and 828 may, if necessary, exchange security information. Note that exchange of security information may be based on a type of security of the NMSG (e.g., open, shared key, individual source key).

Once handshaking (message exchanges) is complete, NAN layer 826 may confirm the multicast session with upper layer 816 at 848. Similarly, at 850, NAN layer 828 may confirm the multicast session with upper layer 818. At 852 sink 808 may bind a local interface for the multicast communication and become an NMSG sink.

Figure 9:
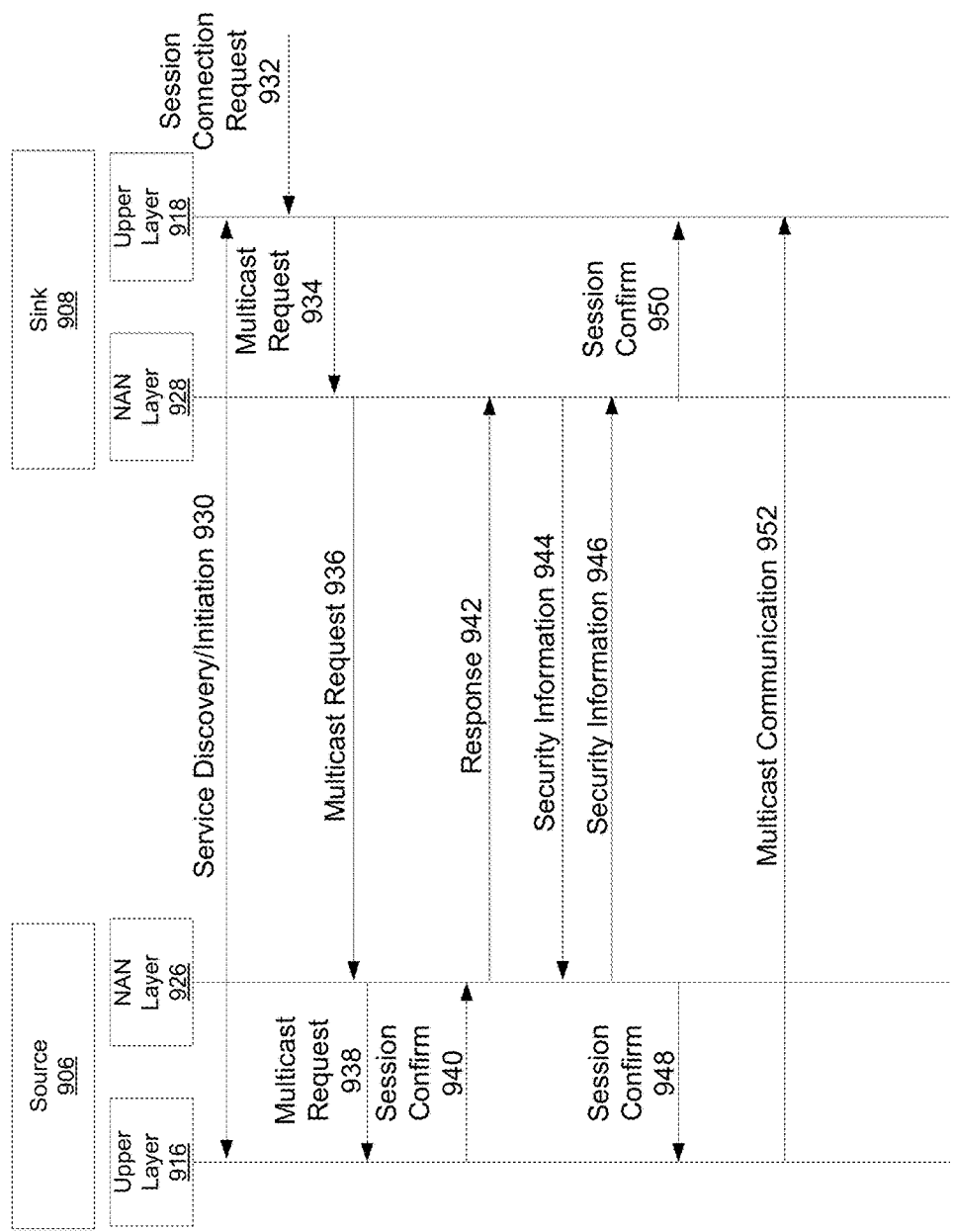
FIG. 9 illustrates example signaling for enrollment of a multicast source by an NMSG sink enroller according to some embodiments.

Turing to FIG. 9, the signaling shown in FIG. 9 may be used in conjunction with any of the systems or devices shown in the above Figures, among other devices. In various embodiments, some of the signaling shown may be performed concurrently, in a different order than shown, or may be omitted. Additional signaling may also be performed as desired.

As illustrated, when an NMSG sink enroller, e.g., sink 908 discovers a multicast source, e.g., source 906, that is not a member of the NMSG, the NMSG sink enroller may invite the multicast source into the NMSG by transmitting a multicast request message to the multicast source. In other words, once a service has been discovered and/or initiated at 930, e.g., via negation between NAN layer 926 of source 906 and NAN layer 928 of sink 908, sink device 908 may request that source 906 join an NMSG by transmitting a multicast request message at 936 to source device 906, e.g., the NMSG source enrollee. Note that source 906 and sink 908 may be wireless stations such as wireless station 106 described above. Note further that source 906 may include upper layer 916 and NAN layer 926. Similarly, sink 908 may include upper layer 918 and NAN layer 928. In some embodiments, the multicast request may be initiated by an application on sink 908 and the application may notify upper layer 918 of the multicast request via a session connection request at 932. Further, upper layer 918 may transmit the multicast request (or an indication of the multicast request) to NAN layer 928 at 934.

In some embodiments, the multicast request message may include parameters of the NMSG as described above (e.g., NMSG multicast MAC address, NMSG session ID, NMSG multicast schedule, and so forth). In some embodiments, source 906 may accept or reject the multicast request and transmit a multicast response message to sink 908 (e.g., the NMSG sink enroller) at 942. In some embodiments, NAN layer 926 may transmit the multicast request received at 936 to upper layer 916 at 938 and upper layer 916 may transmit a multicast session confirmation or rejection to NAN layer 926 at 940.

At 944 and 946, NAN layers 926 and 928 may, if necessary, exchange security information. Note that exchange of security information may be based on a type of security of the NMSG (e.g., open, shared key, individual source key). In some embodiments, if the service instance requires security, multicast security confirm and multicast security install messages may be exchanged to communicate (or convey) multicast security keys.

Once handshaking (message exchanges) is complete, NAN layer 926 may confirm the multicast session with upper layer 916 at 948. Similarly, at 950, NAN layer 928 may confirm the multicast session with upper layer 918. At 952, if source 906 accepts the invitation, source 906 may bind a local interface for the multicast communication and become an NMSG source.

In some embodiments, a NAN device may be configured as a dual role device (e.g., both a multicast sink and a multicast source). In such embodiments, once the NAN device is enrolled into an NMSG as either an NMSG source or NMSG sink, it may become both an NMSG source and NMSG sink. In other words, the NAN device may be enrolled as either an NMSG sink or an NMSG source and then assume the other role after enrollment into the NMSG. Note that in some embodiments, in order to avoid a race condition (e.g., when dual role devices attempt to enroll each other), a dual role device may first enable its multicast sink role and disable its multicast source role. Then, if the dual role device discovers one or more NMSG source enrollers, it may request to join an NMSG. However, if the dual role device cannot find any NMSG source enrollers for a random (or specified) period of time, the dual role device may then enable its multicast source role. Note further that if an NMSG source wants to use an individual source multicast key for security, it may indicate this security requirement in service discovery frames. In such instances, all NMSG sinks may conduct a four-way handshake with the NMSG source (e.g., as illustrated by FIG. 8) to obtain the individual source multicast key.

NAN Multicast—Group Merging

In some embodiments, when an NMSG sink discovers a multicast source in a different NMSG, the NMSG sink may invite the multicast source to the NMSG or attempt to join the multicast source's NMSG. If the NMSG sink invites the multicast source to the NMSG, the multicast source may accept or reject the invite. If the multicast source accepts the invite, if may inform all multicast sinks in the multicast source's NMSG that the multicast source is changing to the NMSG and invite the multicast sinks to join the NMSG. If the NMSG sink joins the multicast source's NMSG, the NMSG sink may maintain membership in both NMSGs or invite multicast sources in the NMSG to join the multicast source's NMSG.

NAN Multicast—Termination

In some embodiments, an NMSG member may terminate its multicast session based on instruction(s) from a service instance and transmit one or more multicast termination messages to other NMSG member devices. In addition, the NMSG member may update its availability schedules and remove multicast transmission/receive schedules. Note that at MAC level, all NMSG members may indicate its presence by periodically transmitting NAN data beacons and/or keep-alive messages. Thus, if a NMSG source (or sink) cannot detect any NMSG sink (or source) for a specified period of time, it may terminate the multicast session and/or inform the service instance to terminate the multicast session.

NAN Multicast—Schedule

Figure 10:
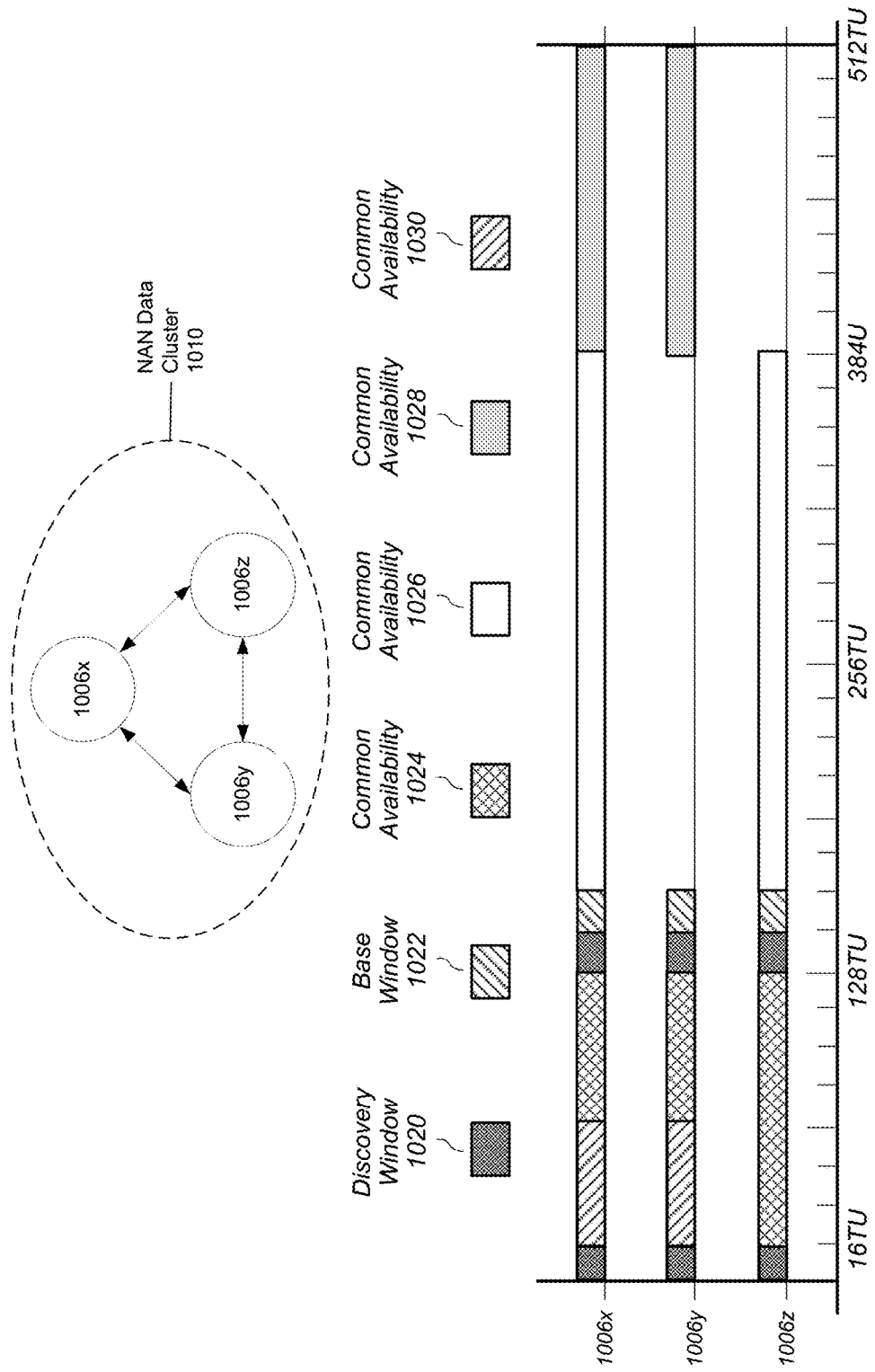
FIG. 10 illustrates an example NMSG multicast schedule, according to some embodiments.

FIG. 10 illustrates an example of an NMSG multicast schedule, according to some embodiments. As shown, NMSG sources and enrollers, e.g., devices 1006x-z within NAN data cluster 1010 may indicate a multicast transmit (TX) schedule based on its availability (e.g., receive (RX)) schedule indication. Not that devices 1006x-z may be configured with features as described above with reference to wireless station 106. As shown, devices 1006x-z may share common discovery window and base window schedules 1020 and 1022 as well as common availability 1024. In addition, devices 1006x and 1006y may share common availability 1030 while devices 1006x and 1006z may share common availability 1028 and devices 1006y and 1006z may share common availability 1026. Note that the availability schedule indication may specify the available time slots and channels for receiving NAN data transmissions. Note further that the multicast schedule indication may only specify a portion of the availability time slots used for multicast transmissions.

NAN Multicast—Additional Embodiments

In some embodiments, a service instance may configure a NAN device as an autonomous NMSG founder. In such embodiments, an autonomous NMSG founder may start an NMSG without being triggered by any multicast sink and may start multicast transmissions without regard to whether there are any multicast sinks within range. In some embodiments, the autonomous NMSG founder may indicate its multicast schedule in its service advertisement, its schedule update, and/or in beacon frames.

In some embodiments, once an NMSG member is configured as an NMSG enroller, it may advertise the NMSG to neighbors. In other words, there is no differentiation between an NMSG source enroller and an NMSG sink enroller. Thus, when a NAN device, either a multicast source, multicast sink, or both, intends to join an NMSG, it may transmit a multicast request message to any NMSG enroller.

In some embodiments, one or more NMSG members may periodically broadcast parameters of the NMSG, including multicast schedule, to neighbors. In such embodiments, if the NMSG is configured with open security, a new NAN device may enroll (or join) into the NMSG passively, e.g., by following parameters of the NMSG for multicast transmission and receiving.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
   at least one antenna;
   at least one radio in communication with the at least one antenna and configured to perform short range communications via a Wi-Fi interface; and
   at least one processor in communication with to the at least one radio;
   wherein the at least one processor is configured to:
      advertise a multicast service instance and device role to one or more neighboring wireless stations, wherein the device role comprises at least one of multicast source and multicast sink;
      receive a first message from a first neighboring wireless station of the one or more neighboring wireless stations requesting a multicast session for the multicast service instance;
      specify at least one parameter defining the multicast service instance;
      transmit, via the at least one radio, to the first neighboring wireless station a second message that includes the at least one parameter; and
      confirm the multicast session.

2. The wireless station of claim 1,
   wherein the at least one parameter comprises at least one of:
      a session identifier (ID);
      a security type; or
      a multicast schedule.

3. The wireless station of claim 2,
   wherein the security type is one of an open security type, a shared key security type, or an individual source key security type.

4. The wireless station of claim 2,
   wherein the session ID includes one or more of multicast port information, a difference between an internet protocol (IP) multicast address and a medium access control (MAC) multicast address, a MAC address of the wireless station, or a start time for the multicast session.

5. The wireless station of claim 1,
   wherein the at least one processor is further configured to:
      receive a third message from the first neighboring wireless station confirming security for the multicast session; and
      transmit, via the at least one radio, a fourth message to the first neighboring wireless station indicating that the security for the multicast session has been installed.

6. The wireless station of claim 1,
   wherein the at least one processor is further configured to:
      receive a third message from a second neighboring wireless station of the one or more neighboring wireless stations requesting a multicast session for the multicast service instance;
      transmit, via the at least one radio, to the second neighboring wireless station, a fourth message that includes the at least one parameter; and
      confirm the multicast session for the second neighboring wireless station.

7. The wireless station of claim 1,
   wherein the first message includes schedule availability of the first neighboring wireless station.

8. The wireless station of claim 1,
   wherein the second message further includes one or more of a medium access layer address of a multicast service group or a transmission schedule for the multicast session.

9. An apparatus, comprising:
   a memory; and
   at least one processor in communication with the memory, wherein the at least one processor is configured to:
      receive an advertisement for a multicast service instance from a first neighboring wireless station, wherein the advertisement includes a device role of the first neighboring wireless station, wherein the device role comprises at least one of multicast sink or multicast source;
      generate instructions to transmit a first message to the first neighboring wireless station requesting a multicast session for the multicast service instance;
      receive, from the first neighboring wireless station, a second message that includes at least one parameter defining the multicast service instance; and
      confirm the multicast session.

10. The apparatus of claim 9,
wherein the at least one parameter comprises at least one of:
- a session identifier (ID);
- a security type; or
- a multicast schedule.

11. The apparatus of claim 10,
wherein the session ID includes one or more of multicast port information, a difference between an internet protocol (IP) multicast address and a medium access control (MAC) multicast address, a MAC address of the first neighboring wireless station, or a start time for the multicast session.

12. The apparatus of claim 9,
wherein the at least one processor is further configured to:
- generate instructions to transmit a third message to the first neighboring wireless station confirming security for the multicast session; and
- receive a fourth message from the first neighboring wireless station indicating that the security for the multicast session has been installed.

13. The apparatus of claim 9,
wherein the at least one processor is further configured to:
- generate instructions to transmit a third message to a second neighboring wireless station requesting a multicast session for an other multicast service instance, wherein the third message includes the at least one parameter;
- receive, from to the second neighboring wireless device, a fourth message that accepts the request; and
- confirm the other multicast session for the second neighboring wireless station.

14. The apparatus of claim 9,
wherein the first message includes schedule availability.

15. The apparatus of claim 9,
wherein the second message further includes one or more of a medium access layer address of a multicast service group or a transmission schedule for the multicast session.

16. A non-transitory computer readable memory medium storing program instructions executable by a processor to:
- advertise a multicast service instance and device role to one or more neighboring wireless stations;
- receive a first message from a first neighboring wireless station of the one or more neighboring wireless stations requesting a multicast session for the multicast service instance;
- select one or more parameters defining a multicast service group;
- generate instructions to transmit to the first neighboring wireless station a second message that includes the one or more parameters defining the multicast service group; and
- confirm the multicast session.

17. The non-transitory computer readable memory medium of claim 16,
wherein the one or more parameters comprise at least one of:
- a session identifier (ID);
- a security type; or
- a multicast schedule.

18. The non-transitory computer readable memory medium of claim 17,
wherein the session ID includes one or more of multicast port information, a difference between an internet protocol (IP) multicast address and a medium access control (MAC) multicast address, a MAC address of the first neighboring wireless station, or a start time for the multicast session.

19. The non-transitory computer readable memory medium of claim 17,
wherein the security type is one of an open security type, a shared key security type, or an individual source key security type.

20. The non-transitory computer readable memory medium of claim 16,
wherein the first message includes potential schedule availability of the first neighboring wireless station.

* * * * *